Dec. 9, 1958 D. E. CAIN ET AL 2,863,324
REDUCTION GEARING SYSTEM
Filed April 2, 1956 3 Sheets-Sheet 2

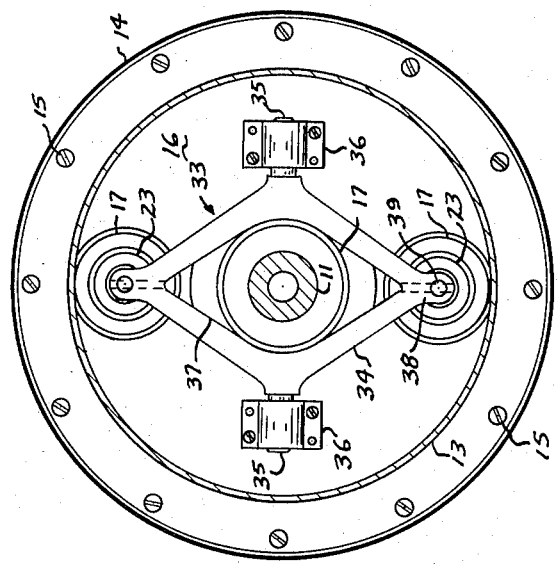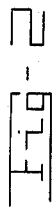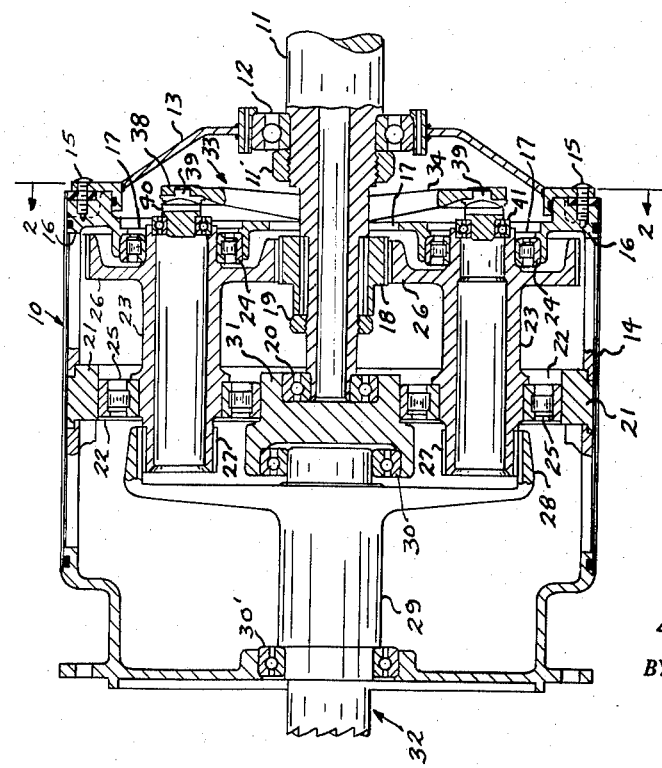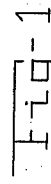

INVENTORS
DALLAS E. CAIN
GEORGE H. FRYUR
BY
ATTORNEY

Dec. 9, 1958

D. E. CAIN ET AL 2,863,324

REDUCTION GEARING SYSTEM

Filed April 2, 1956

INVENTORS
DALLAS E. CAIN
GEORGE H. FRY JR.
BY
ATTORNEY

United States Patent Office 2,863,324
Patented Dec. 9, 1958

2,863,324

REDUCTION GEARING SYSTEM

Dallas Ellsworth Cain, Scotia, and George H. Fry, Jr., Schenectady, N. Y., assignors to the United States of America as represented by the Secretary of the Air Force Application April 2, 1956, Serial No. 575,690

5 Claims. (Cl. 74—410)

This invention relates to reduction gearing and, more particularly, to a reduction gearing system wherein a novel load balancing mechanism is employed for taking up torque and thrust loads imposed on the gearing.

The novel reduction gearing system constructed in accordance with the present invention is particularly characetrized by the use of a much lower design safety factor than it has been possible with prior art planetary gear systems that results in a considerable reduction in size and weight over well known gear reduction units of similar rating.

According to the present invention, a gear train system consists of two or more offset shafts that transmit power from an input gear mesh to an output gear mesh. Gear teeth of one or both of these gear meshes have helix angles such that a load on the output gear mesh produces a net thrust on each of the offset shafts. Roller bearings on the offset shafts allow free axial movement of the offset shafts, taking none of the thrust loads. Thrust loads are carried by a novel balancing mechanism consisting of a mechanical system of levers stabilized only when the thrust loads, and, therefore, the torque loads, carried by each offset shaft are equal. When the thrust and torque loads are unequal, the balancing mechanism readjusts the axial position of the offset shafts until an equilibrium condition is obtained.

These and other novel features of the present invention are described in detail below in connection with the accompanying drawings, in which:

Figure 1 is a side elevation, partly in section, of a reduction gearing system in accordance with the present invention;

Figure 2 is a section taken along the line 2—2 in Figure 1;

Figure 4:
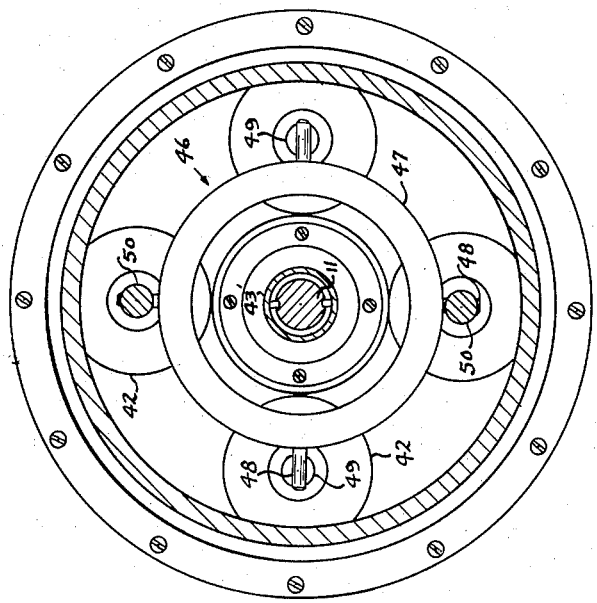
Figure 4 is a section taken along the line 4—4 in Figure 3.

Referring now in detail to the drawings wherein like numerals designate like parts throughout the several views, the embodiment of the reduction gearing system of the present invention illustrated in Figures 1 and 2 is indicated generally by the reference numeral 10 and, as shown, comprises an input power shaft 11 journaled in a bearing 12 carried by a supporting plate 13 forming a part of a casing 14, to which casing 14 the plate 13 may be fastened as by screws 15. A nut 11' threaded on the shaft 11 locks the bearing 12 on the shaft 11. Attached, also, to the casing 14 is a second supporting plate 16 having a number of openings 17 arranged diametrically and spaced vertically on the plate 16. Through the center one of the openings 17, extends the input shaft 11 which carries a helical pinion 18 splined thereto and held from moving axially on the shaft 11 by a nut 19. The shaft 11 is further journaled at the other end in a bearing 20 carried in a center opening of a third supporting plate 21, also, provided with openings 22 corresponding to the openings 17 of the plate 16.

Extending through the outer ends of the openings 17 and 22 of the supporting plates 16 and 21, respectively, are offset shafts 23 journaled in roller bearings 24, 25 carried by the plates 16, 21 in the openings 17 and 22. The roller bearings 24, 25 are arranged to permit axial movement of the offset shafts 23 for a purpose hereinafter described. Each of the offset shafts 23 carries a helical gear 26 integral therewith, or attached thereto in any suitable manner, and meshed with the helical pinion 18 of the input shaft 11. The offset shafts 23 are each further formed with a spur pinion 27 at its end extending rearwardly of the supporting plate 21, which spur pinions 27 engage a spur gear 28 having internal teeth and carried on an output shaft 29 arranged coaxially with the input shaft 11. The output shaft 29 is journaled in a bearing 30 carried in an extension 31 at the center of the supporting plate 21. The output shaft 29 is further journaled in a bearing 30' carried by the casing 14 and which shaft 29 may be adapted to be engaged by a clutch arrangement indicated generally at 32.

It is apparent, therefore, that the output shaft 29 is driven by the input shaft 11 through the offset shafts 23. It should also be noted that the teeth of the helical gears 26 and the helical pinion 18 are arranged so that a load on the output shaft 29 produces a torque load on each helical gear 26, which torque imposes a net axial thrust load on each offset shaft 23. The thrust forces imposed on the offset shafts 23 will impart thereto axial movements in the same direction.

In order to equalize the torque loads on the offset shafts 23, a thrust balancing lever mechanism 33 is employed, which mechanism 33 comprises a lever 34 pivotally mounted on the supporting plate 16 by pins 35 extending laterally, substantially at the center of the lever 34, and which pins 35 pivot in brackets 36 attached to the supporting plate 16 as shown in Figure 2. The lever 34 being of a substantially diamond shape is further formed with an aperture 37 through which extends the input shaft 11. In this manner, the lever 34 is mounted coaxially with the pinion 18 and the gear 28, and in a concentric relation to the input shaft 11. The outer ends 38 of the lever 34 are operatively connected to the front ends of the offset shafts 23 arranged in diametrically opposite sides of the helical pinion 18 and the input shaft 11. The outer ends 38 are each provided with a bearing element 39 having a curved bearing surface engaging a pad 40 supported in a bearing 41 at the front end of each offset shaft 23.

By this arrangement, axial movements of the offset shafts 23, imparted thereto by the axial thrust forces thereon, will be opposed by the lever 34 which will readjust the axial position of each offset shaft 23 to bring equilibrium to the system. The lever 34 is stabilized only when the thrust loads and, therefore, the torque loads on the offset shafts 23 are equal.

Figure 3:
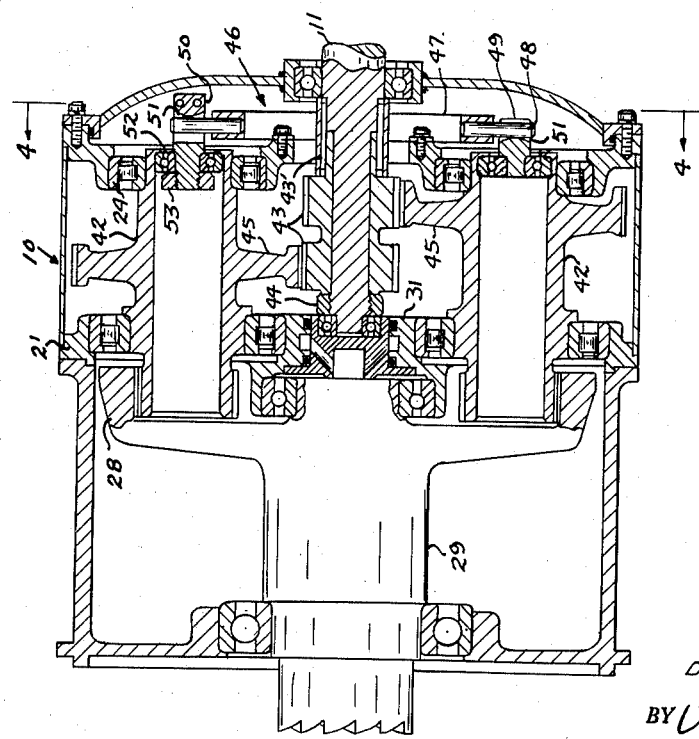
Figure 3 is a similar view to Figure 1 showing a side elevation, partly in section, of another embodiment of the present invention.

In Figures 3 and 4, another embodiment of the present invention is shown, generally similar to that illustrated in Figures 1 and 2 except that four offset shafts 42 are employed in the system instead of the two of that above described. The thrust balancing lever mechanism employed in this system is likewise modified accordingly. The input shaft 11 in this embodiment carries a pair of helical pinions 43 having teeth of opposite helix angle, arranged in tandem and splined to the shaft 11 as at 43'. A nut 44 retains the pinions 43 in place. Offset shafts 42 carry helical gears 45 equidistantly spaced around the pinions 43 and meshed therewith. The helix angles of the pinions 43 and the gears 45 are so arranged that diametrically opposite offset shafts 42 have thrust loads in the same direction while adjacent shafts 42 have thrust loads in opposite directions. The thrust loads imposed on the offset shafts 42 by the torque loads on the helical gears 45 are balanced by a thrust balancing lever mechanism, as generally indicated at 46, consisting of an unrestrained thrust ring element 47 mounted in a concentric relation to the input shaft 11 and in a coaxial relation to the pinions 43 and to the spur gear 28 of the output shaft 29.

The thrust ring element 47 is operatively connected to the offset shafts 42 by pins 48 extending radially thereof and engaging bearing elements 49, 50 having curved bearing surfaces 51 and supported in ball bearings 52 at the front ends of the offset shafts 42. Furthermore, the bearing elements 50 of the diametrically opposite offset shafts 42, the gears 45 of which are meshed with the inner of the pinions 43, as shown in Figure 3, have their curved surfaces 51 facing opposite to those of the bearing elements 49 since the axial thrust loads thereon are in a direction towards the left of Figure 3, and, obviously, the reaction of the thrust ring element 47 will be to right thereby axially adjusting the positions of these shafts 42. A nut 53 on each bearing element 50 will retain the bearing 50 in its ball bearing 52 during application of the adjusting force thereon by the thrust ring element 47. In the other two offset shafts 42, the gears 45 of which are meshed with the outer of the pinions 43, the axial thrusts are in a direction toward the right of Figure 3. Obviously, the reaction of the thrust ring element 47 will be towards the left of Figure 3 thereby axially adjusting the positions of these shafts 42.

By this arrangement, the ring element 47 will be pivoted on any two of the shafts 42 while acting as a lever for adjusting the axial positions of the other two shafts 42 until a condition of equilibrium is reached by equalizing the torque loads on all of the gears 45 and, therefore, balancing the thrust loads on the offset shafts 42. The helical pinions 43 being formed with teeth of opposite helix angle cancel or balance out thrust loads and thereby restrain any transmission of thrust loading to the input shaft 11.

Figure 6:
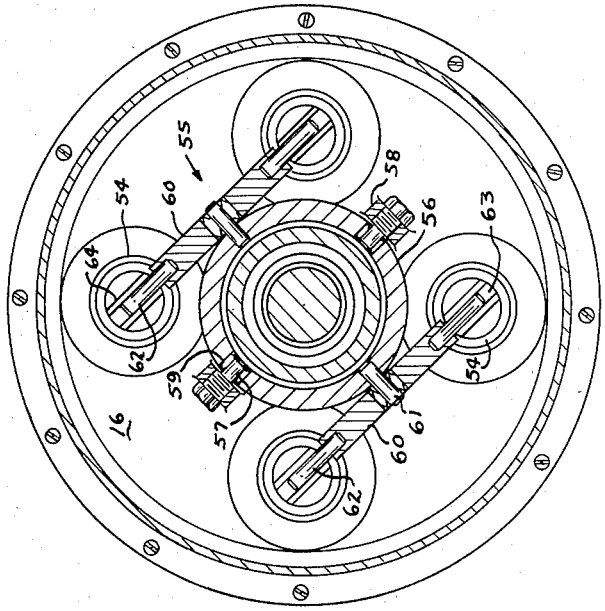
Figure 6 is a section taken along the line 6—6 in Figure 5.
Figure 5:
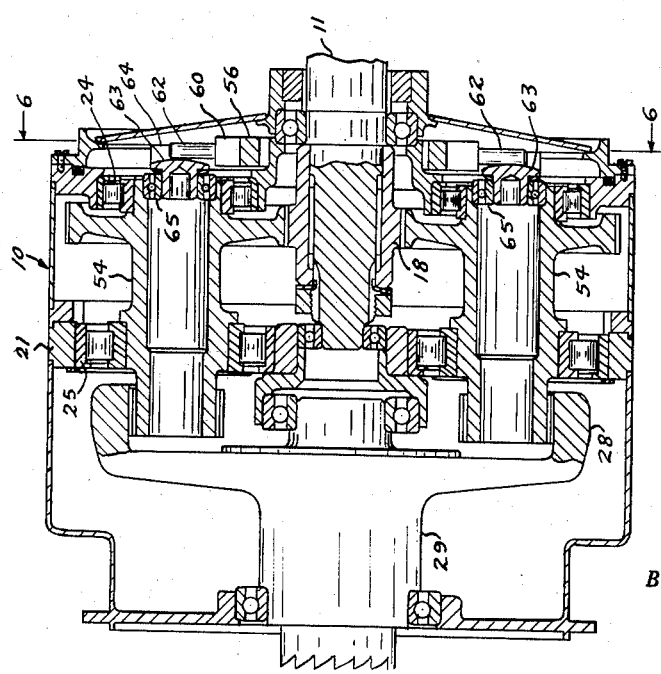
Figure 5 is a similar view to Figure 1 showing a side elevation, partly in section, of a still further embodiment of the present invention.

Figures 5 and 6 show a still further embodiment of the reduction gearing system according to the present invention, generally similar to those above described, and wherein four offset shafts 54, similar to the offset shafts 23, are employed, and on which shafts 54 and the thrust loads are in the same direction. Thrust loads on these shafts 54 are balanced by a lever mechanism 55 consisting of a gimbal ring 56 mounted in a concentric relation to the input shaft 11 coaxially of the helical pinion 18 and the spur gear 28. The ring element 56 is pivotally supported on the plate 16 by pins 57 threadedly secured to lugs 58 on the plate 16, the pins 57 engaging bearings 59 in the gimbal ring 56.

A pair of levers 60 pivotally mounted at the center thereof on pins 61 secured to and extending diametrically of the ring element 56 are each operatively connected to two adjoining offset shafts 54 by pins 62 bearing on curved surfaces 63 of bearing elements 64 supported in roller bearings 65. In this manner, each lever 60 balances the thrust loads on the two offset shafts 54 engaged thereby, similarly to the first embodiment above described, and the total loads carried by each lever 60 are, in turn, balanced by the pivoted gimbal ring element 56 again bringing equal distribution of the thrust and torque loads on the offset shafts 54 and their gearing.

The present invention has been described in detail above for purposes of illustration only and is not intended to be limited by this description or otherwise except as defined in the appended claims.

We claim:

1. In a reduction gearing system, a supporting plate, an input shaft bearing mounted in said plate, an output shaft in axial alignment with said input shaft, at least one helical pinion on said input shaft, a plurality of offset shafts spaced around said input shaft, a helical gear on each of said offset shafts meshed with said helical pinion, a gear on said output shaft and a pinion on each of said offset shafts meshed therewith, said offset shafts mounted in roller bearings for axial movement imparted thereto by thrust loads in response to torque loads imposed on said helical gears by said output shaft, and thrust balancing lever means pivotally mounted on said supporting plate coaxially of said input shaft helical pinion and said output shaft gear including spaced bearing means between said thrust balancing lever means and said offset shafts at the ends thereof adjacent thereto, said bearing means incorporating a curved element complementally engaged with the ends of said offset shafts for readjusting the axial position of each of said offset shafts to balance the thrust loads thereon thereby equalizing the torque loads on said pinions.

2. In a gear transmission, an input shaft, an output shaft having a gear and being in axial alignment with said input shaft, a helical pinion on said input shaft, a pair of offset shafts spaced diametrically of said input shaft and mounted on bearings permitting only axial movement thereof, a helical gear and a pinion carried by each offset shaft, said helical gears engaging said helical pinion and said pinions engaging said output shaft gear, said offset shafts being subjected to an axial thrust load imparted thereto in the same direction by torque loads imposed on said helical gears by a load on said pinions and gear mesh, and a thrust balancing lever device pivotally mounted substantially at the center thereof in a concentric relation to said input shaft and extending substantially diametrically of said helical pinion and operatively engaging said offset shafts at an end thereof for axially adjusting said offset shafts thereby balancing the thrust loads thereon, said lever device comprising a diamond-shaped lever formed with a central aperture disposed in surrounding relation to said input shaft, a pair of pivotally mounted pins extending laterally of said lever and a pair of projecting outer end portions extending transversely of said pivotally mounted pins and each provided with a curved bearing member, each of said offset shafts having a pod at one end thereof in complemental engagement with said curved bearing members.

3. In a gear transmission, a pair of helical pinions carried in tandem on an input shaft, a pair of helical gears equidistantly spaced around each pinion and meshed therewith, offset shafts for said gears mounted for axial movement imparted thereto by axial thrust loads caused by torque loads imposed on said gears, said pinions and gears having helix angles arranged so that said offset shafts of each of said pairs of gears have thrust loads in the same direction and said offset shafts of one of said pairs of gears have thrust loads in an opposite direction of that of the other of said pairs of gears, and a thrust balancing lever mechanism including a free floating thrust ring element having radial extensions operatively engaging oppositely facing curved bearing elements at the ends of said offset shafts whereby the axial positions of said shafts are controlled by said lever mechanism thereby balancing the thrust loads on said offset shafts and also cancelling thrust loads on said input shaft.

4. In a gear reduction unit, an input shaft, a helical pinion mounted on said input shaft, a plurality of offset shafts mounted diametrically of said input shaft for axial movement, a set of helical gears mounted on said offset shafts for axial movement therewith and meshed with said pinion, said helical gears being subjected to axial thrust loads in the same direction imparted thereto by torque loads on said gears, and a thrust balancing mechanism comprising a thrust carrying gimbal ring element pivotally mounted in concentric relation to said input shaft, and levers pivotally mounted substantially at the centers thereof on said gimbal ring element, each of said offset shafts incorporating an accurate bearing element on one end thereof and each of said levers having a pin at each end thereof engaged with the arcuate bearing elements of a respective pair of said offset shafts for balancing the thrust loads on said gears whereby the total thrust loads carried by said levers are in turn balanced by said gimbal ring element providing equal distribution of the thrust loads on all of said gears.

5. In a gear transmission, a helical pinion carried on an input shaft, a plurality of helical gears carried on offset shafts spaced diametrically of and meshed with said pinion, said offset shafts mounted for axial movement imparted thereto by axial thrust loads imposed thereon in the same direction by torque loads on said gears, a thrust balancing gimbal ring element pivotally mounted in a concentric relation to said input shaft, a pair of levers each pivotally mounted substantially at the center thereof on said gimbal ring element, each of said levers having a projecting element operatively engaged at the ends thereof in a curved bearing member affixed in one end of each of an adjacent pair of offset shafts for adjusting the axial positions of the helical gears mounted thereon thereby balancing the thrust loads thereon, and the total thrust loads carried by said levers being in turn balanced by said gimbal ring element to provide equal distribution of the thrust loads on all of said gears.

References Cited in the file of this patent

UNITED STATES PATENTS

| | | |
|---|---|---|
| 1,898,198 | Lysholm | Feb. 21, 1933 |
| 2,225,863 | Halford | Dec. 24, 1940 |
| 2,231,784 | Von Thungen | Feb. 11, 1941 |
| 2,518,708 | Moore | Aug. 15, 1950 |

FOREIGN PATENTS

| | | |
|---|---|---|
| 878,140 | Germany | June 1, 1953 |